United States Patent
Hirane

[19]

[11] Patent Number: 6,159,364
[45] Date of Patent: Dec. 12, 2000

[54] WATER TREATMENT SYSTEM BASED ON DENITRIFICATION

[75] Inventor: Ken Hirane, Tokyo, Japan

[73] Assignee: Daiwa Kogyo Kabushiki Kaisha, Tokyo, Japan

[21] Appl. No.: 09/323,774

[22] Filed: Jun. 1, 1999

[30] Foreign Application Priority Data

Jun. 19, 1998 [JP] Japan .................................. 10-172462

[51] Int. Cl.⁷ ...................................................... C02F 3/30
[52] U.S. Cl. ......................... 210/150; 210/202; 210/259
[58] Field of Search ................................ 210/198.1, 202,
210/205, 220, 259, 295, 150, 903, 611, 616, 630

[56] References Cited

U.S. PATENT DOCUMENTS

| | | | |
|---|---|---|---|
| 4,183,810 | 1/1980 | Baenens et al. ........................ | 210/903 |
| 5,342,522 | 8/1994 | Marsman et al. ....................... | 210/605 |
| 5,578,202 | 11/1996 | Hirane ...................................... | 210/151 |
| 5,587,079 | 12/1996 | Rowley et al. .......................... | 210/603 |
| 5,637,220 | 6/1997 | Buisman ................................... | 210/605 |
| 5,766,454 | 6/1998 | Cox et al. ................................ | 210/150 |

*Primary Examiner*—David A. Simmons
*Assistant Examiner*—Frank M. Lawrence
*Attorney, Agent, or Firm*—Marshall & Melhorn

[57] ABSTRACT

To allow compact and simple design of a water treatment system capable of denitrification, an anaerobic treatment vessel 3 is provided downstream of an aerobic treatment vessel 2, and a filter layer 5 having a large number of carriers for microbes filled therein is formed in the anaerobic treatment vessel so that sulfur contents may be reduced by sulfate reducing microbes bred in the filter layer and the nitrate nitrogen is gasified by sulfur denitrification microbes with the aid of the sulfides thus obtained. In particular, the carriers preferably comprise a floating filter material in the form of plastic foam blocks that can float in the water.

4 Claims, 1 Drawing Sheet

WATER TREATMENT SYSTEM BASED ON DENITRIFICATION

TECHNICAL FIELD

The present invention relates to a water treatment system which is capable of biologically denitrifying nitrogen components in the water with the aid of microbes.

BACKGROUND OF THE INVENTION

According to a known water treatment system for denitrifying nitrogen components in the water which are an important cause of water eutrophication, a part of the treated water passed through an aerobic treatment vessel is returned to an anaerobic vessel on the upstream so that the nitrogen components in the water which have been nitrified in the aerobic treatment vessel with the aid of nitrifying microbes are gasified in the anaerobic vessel on the upstream with the aid of heterotrophic denitrification microbes.

However, according to such a conventional water treatment system, an aeration process of a long time duration in the order of 10 hours is necessary for the nitrification of ammonia nitrogen in the aerobic treatment vessel on the downstream end. Also, a resident time of four to five hours is necessary for the denitrification to be completed in the anaerobic treatment vessel on the upstream end. As such, the system tends to be undesirable large in size, and requires a large floor area. Furthermore, when the water to be treated lacks organic carbonaceous components which are necessary for the denitrification process, it is necessary to add carbonaceous materials such as methanol to the water. For re-circulating or recycling the water which has been treated in the aerobic treating vessel back to the anaerobic treatment vessel, facilities such as piping arrangements and pumps are required, and it tends to undesirably complicate the system.

BRIEF SUMMARY OF THE INVENTION

In view of such problems of the prior art, a primary object of the present invention is to provide a water treatment system which is capable of denitrification with a compact and simple arrangement.

A second object of the present invention is to provide a water treatment system which is capable of treating water to a high level of purity with a minimum amount of time.

A third object of the present invention is to provide a water treatment system which is suitable for treating water contaminated by sewage from households.

According to the present invention, such objects can be accomplished by providing a water treatment system based on denitrification, comprising: an aerobic treatment vessel for decomposition and fixation of organic substances and nitrification of nitrogen components based on oxidization of the nitrogen components into nitrate nitrogen using nitrification microbes; and an anaerobic treatment vessel connected to a downstream end of the anaerobic treatment vessel and having a floating filter layer for denitrification based on gasification of the nitrate nitrogen; the floating filter layer in the anaerobic treatment vessel including a large number of carriers for microbes filled therein whereby sulfur contents is reduced by sulfate reducing microbes bred on the carriers and the nitrate nitrogen is gasified by sulfur denitrification microbes bred on the carriers with the aid of the sulfides thus obtained. Typically, the aerobic treatment vessel includes a floating filter layer consisting of foamed plastic particles, and the carriers also comprise foamed plastic particles formed as a floating filter layer.

According to this system, the denitrification process takes place as described in the following. Ammonia nitrogen contained in the waste water as a nitrogen component is oxidized into nitrate nitrogen with the aid of nitrification microbes. More specifically, by virtue of the activities of Nitrosomonas, Nitrococcus, etc., the following chemical reaction takes place, $$NH_4^+ + (3/2)O_2 \rightarrow NO_2^- + H_2O + 2H^+$$

and by virtue of the activities of Nitrobactor, Nitrocystis, etc., the following chemical reaction takes place $$NO_2 + (\tfrac{1}{2})O_2 \rightarrow NO_3^-.$$

Additionally, organic substances in the waste water are subjected to decomposition and fixation by aerobic microbes so that the BOD (biological oxygen demand), COD (chemical oxygen demand) and SS (suspended solids) are reduced.

In the anaerobic treatment vessel on the downstream end, sulfur contents such as sulfates in the waste water are reduced to hydrogen sulfide with sulfate reduction microbes such as Desulfovibrio desulfuricans or the like as a sulfate respiration process. This reaction may be expressed as given in the following.

$$SO_4^{2-} + 4H_2 + H^+ \rightarrow HS^- + 4H_2O$$

The hydrogen sulfide thus obtained as a result of sulfate reduction is oxidized into sulfates with the aid of sulfur denitrification microbes such as Beggiatoa and Thiothrix while the nitrate nitrogen obtained in the nitrification process in the aerobic treatment vessel is converted into nitrogen gas. This reaction may be expressed as given in the following.

$$5HS^- + 8NO_3^- + 3H^+ \rightarrow 5SO_4^{2-} + 4N_2 + 4H_2O$$

The nitrogen gas produced from this nitrification process is finally released to the atmosphere. Additionally, in the anaerobic treatment vessel, denitrification of the remaining organic substances by heterotrophic denitrification microbes takes place at the same time.

Thus, according to the present invention, by using a filter layer having a large number of carriers for microbes filled therein in the anaerobic treatment vessel, the useful microbes can be kept in a highly active state, and a denitrification process can be carried out without requiring any carbon source. As a result, the need for the facilities for adding a carbonaceous substance can be eliminated. Also, the anaerobic treatment vessel may be placed on the downstream end of the aerobic treatment vessel so that the need for piping arrangements and pumps for recycling the nitrified liquid can be eliminated. The sulfate reduction process requires sulfur contents, but as the waste water normally contains sulfur contents matching the nitrogen content, addition of sulfur contents are normally unnecessary. If the waste water lacks adequate sulfur contents, it may be preferable to provide a source of sulfur contents in view of maintaining a stable treatment process.

The aforementioned carriers preferably consist of porous material which can favorably retain microbes. The carriers may form a fully sunk, stationary filter layer in the water, or a fluidized bed by fluidization, but more preferably form a floating filter layer by having a specific weight suitable for floatation in the water. According to the latter arrangement, as compared to the stationary filter layer, the efficiency of the contact between the waste water and the microbes can be improved, and the activity of the microbes can be enhanced, with the result that the time required for treatment can be minimized. Also, as compared to a fluidized bed, the biological film has a reduced tendency to peel off from the carriers and mix into the waste water so that the need for a post-precipitation process can be eliminated. The floating filter material may consist of fibrous material, for instance, but more preferably consist of blocks of foamed plastic as they are more durable and less likely to be washed away.

According to a preferred embodiment of the present invention, the floating filter layer has a large depth so that the sulfate reducing microbes and the sulfur denitrification microbes may be bred in upper and lower parts of the floating filter layer in a substantially mutually exclusive relationship. Thereby, the activities of the microbes of each of the two different groups can be maintained at to a high level, and the overall efficiency of the water treatment can be enhanced.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
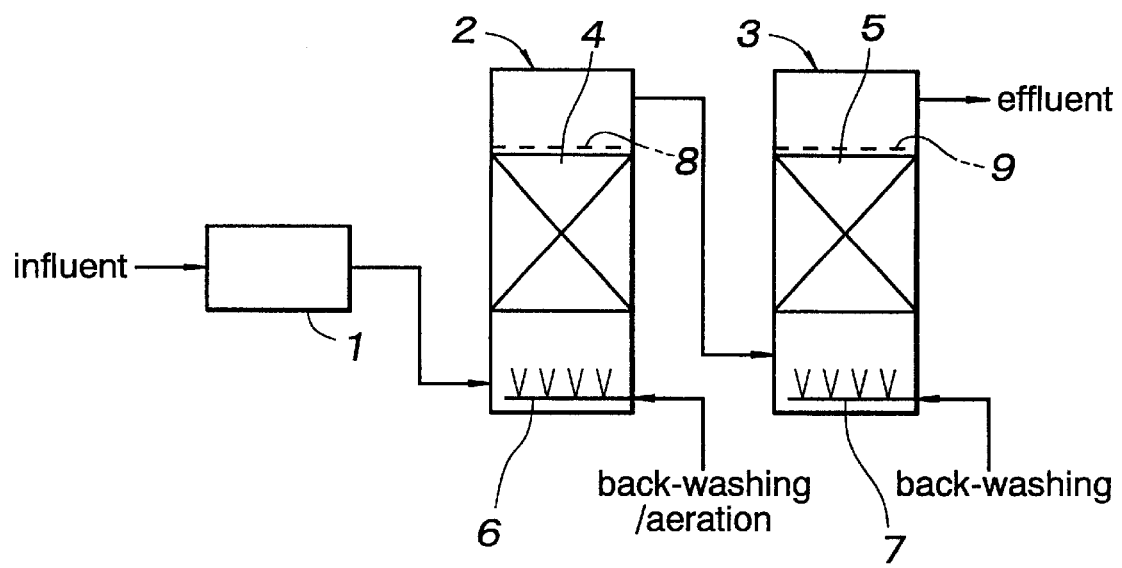
FIG. 1 is a diagrammatic view of a water treatment system embodying the present invention.

FIG. 1 illustrates a water treatment system constructed according to the present invention. In this water treatment system, the waste water to be treated is first passed through a screen 1 to remove garbage therefrom, and is then purified by being passed through an aerobic treatment vessel 2 and an anaerobic treatment vessel 3 in that order.

In each of the vessels 2 and 3 for aerobic and anaerobic water treatment, a retaining grid 8 and 9 for preventing filter material from being washed away separates the interior of the vessel into upper and lower parts, and a floating filter layer 4 or 5 is formed by a large number of blocks of floating filter material with the retaining grid retaining the filter layer under the retaining grid against the buoyancy of the filter material.

The floating filter material in this case consists of particles (having a diameter of 10 to 30 mm, for instance) of foamed plastic or the like, and has a specific weight slightly smaller than or similar to that of the water so as to demonstrate a suitable amount of buoyancy. Microbes attach to the surface of the filter material by forming biofilm thereon, and breed therein.

In each of the aerobic and anaerobic treatment vessels 2 and 3, the waste water flows in from a lower part thereof, and is drawn out from an upper part thereof, and thus flows upward through the filter layer 4 and 5. However, as can be readily appreciated by a person skilled in the art, other possibilities of the direction of flow in each vessel is within the purview of the present invention.

An back-washing pipe 6 or 7 is provided in a lower part of each of the treatment vessels 2 or 3. The back-washing pipe 6 for the aerobic treatment vessel 2 serves the dual purposes of keeping the floating filter always aerated and back-washing the filter layer to prevent clogging from time to time, and receives a supply of air, heavy oxygen or the like. On the other hand, the back-washing pipe 7 for the anaerobic treatment vessel 3 is provided solely for the purpose of back-washing the filter layer, and preferably receives a supply of inert gas such as nitrogen which would not disturb the anaerobic condition in the vessel.

In the floating filter layer 4 of the aerobic treatment vessel 2 breed aerobic microbes which ingest organic substances in the water, and decompose and fix the organic substances in the water. The floating filter layer 4 retains nitrification microbes, which nitrifies nitrogen content in the water, at a high concentration, and promote the nitrification process or the oxidization of nitrogen components into nitrate nitrogen.

In the floating filter layer 5 of the anaerobic treatment vessel 3 breed sulfate reduction microbes and sulfur denitrification microbes. The sulfate reduction microbes promote a sulfate reduction reaction for reducing the sulfur contents in the water, and the obtained sulfides are used for the denitrification by sulfur denitrification microbes which gasify the nitrate nitrogen obtained in the aerobic treatment vessel 2. In this conjunction, the floating filter layer 5 is given with a relatively large depth (3 m, for instance) so that the sulfate reduction microbes and the sulfur denitrification microbes may breed primarily upper and lower parts of the filter layer, respectively, and the two processes of sulfate reduction and sulfur denitrification may take place in a sequential manner. The floating filter layer 5 promotes a heterotrophic denitrification making use of remaining organic substances as well as the denitrification by the microbes mentioned above. When the waste water contains relatively small amounts of sulfate reduction microbes and sulfur denitrification microbes as is often the case with industrial waste water, it may be preferable to breed such microbes in advance.

Although the present invention was described with respect to an embodiment using a single vessel for each of the aerobic and anaerobic treatment processes, the present invention is not limited by such an embodiment, but may also take various other forms depending on the quality of the waste water. For instance, in case of waste water which is rich in ammonia nitrogen, two vessels may be used for each of the aerobic and anaerobic treatment processes.

EXAMPLE

A water treatment system described above was actually used for treating waste water. The waste water in this case consisted of river water whose primary source of contamination was household sewage. The resident time was one hour in each of the aerobic and anaerobic treatment vessels. The obtained result indicated a drastic reduction in the T-N (total nitrogen content) resulting from the anaerobic treatment as shown in the table below, and a high level of denitrification which was achieved in such a short time is a proof to the effectiveness of the present invention. The BOD and SS were also reduced to a substantial extent in the process of aerobic treatment, and were further reduced by the anaerobic treatment. There was no substantial change in the T-S (total sulfur content).

TABLE 1

|  | waste water | aerobic treatment | anaerobic treatment |
| --- | --- | --- | --- |
| BOD | 30.2 | 5.2 | 4.3 |
| T-N | 7.7 | 6.1 | 0.81 |
| SS | 22 | 4.8 | 3.2 |
| T-S | 8.3 | — | 8.2 |

Thus, according to the present invention, no arrangement for adding a carbonaceous substance is required because the denitrification process would not require any carbon source, and no arrangement for recycling the nitrified liquid from the aerobic treatment vessel back to the anaerobic treatment vessel, that may include piping arrangements and pumps, is required. Therefore, the present invention can simplify the structure of the overall system, and can reduce various costs including the cost for power.

In particular, when a floating filter material is used as the carriers of microbes, the efficiency of contact between the waste water and the microbes can be improved, and the activity of the microbes can be enhanced. Therefore, a high level of denitrification can be achieved in a relatively short time period of one to three hours. The present invention therefore allows a substantial reduction in the treatment time, and a reduction in the necessary floor area through compact design. Furthermore, no post-precipitation process is required, and this also contributes to the simplification of the structure of the system.

Although the present invention has been described in terms of preferred embodiments thereof, it is obvious to a person skilled in the art that various alterations and modifications are possible without departing from the scope of the present invention which is set forth in the appended claims.

What is claimed is:

1. A water treatment system based on denitrification, comprising:

an aerobic treatment vessel for decomposition and fixation of organic substances and nitrification of nitrogen components based on oxidization of said nitrogen components into nitrate nitrogen using nitrification microbes; and an anaerobic treatment vessel connected to a downstream end of said anaerobic treatment vessel and having a floating filter layer for denitrification based on gasification of said nitrate nitrogen;

said floating filter layer in said anaerobic treatment vessel including a large number of carriers for microbes filled therein whereby sulfur contents is reduced by sulfate reducing microbes bred on said carriers and said nitrate nitrogen is gasified by sulfur denitrification microbes bred on said carriers with the aid of said sulfides thus obtained.

2. A water treatment system according to claim 1, wherein said aerobic treatment vessel includes a floating filter layer.

3. A water treatment system according to claim 1, wherein said carriers comprise foamed plastic particles formed as a floating filter layer.

4. A water treatment system according to claim 3, wherein said floating filter layer has a large depth so that said sulfate reducing microbes and said sulfur denitrification microbes may be bred in upper and lower parts of said floating filter layer in a substantially mutually exclusive relationship.

* * * * *